May 24, 1966

F. J. HERRINGTON, JR 3,252,301

RESILIENT SHAFT COUPLING

Filed April 28, 1964

INVENTOR.
Fox John Herrington, Jr.
BY
Robert L. Spencer
ATTORNEY

United States Patent Office 3,252,301
Patented May 24, 1966

3,252,301
RESILIENT SHAFT COUPLING
Fox John Herrington, Jr., Rochester, N.Y., assignor to General Motors Corporation, Detroit, Mich., a corporation of Delaware
Filed Apr. 28, 1964, Ser. No. 363,073
4 Claims. (Cl. 64—27)

This invention relates to a resilient shaft coupling and more particularly to a coupling which is torsionally flexible and also provides an axial biasing force for maintaining a constant coupling length.

An object of this invention is to provide a resilient coupling member for joining the adjacent ends of a pair of aligned shafts for transmitting torque as applied by one shaft to the other shaft through a resilient member of the coupling.

Another object of this invention is to provide a resilient coupling with a resilient torque transmitting member that also imparts an axial biasing action whereby the associated shafts are biased toward each other and a constant coupling length is maintained.

A further object of this invention is to provide a resilient coupling having a pair of coupling members adapted to be secured to the ends of a pair of adjacent aligned shafts with a coupling sandwich consisting of a resilient core with an inner sleeve and an outer sleeve bonded thereto for joining the respective coupling member. The coupling sandwich has a step on its inner surface and a step on its outer surface whereby the inner surface may be press fit to one of the coupling members and the outer surface may be press fit to the other of the coupling members so that when torque is transmitted from one coupling member to the other such torque is transmitted through the coupling sandwich.

Another object of this invention is to provide a flexible coupling in which the overall length of the coupling is determined by metal to metal contact of opposing parts under a biasing force of the resilient core member.

These and other objects of this invention will become more apparent as reference is had to the accompanying specification and drawings wherein.

Figure 1:
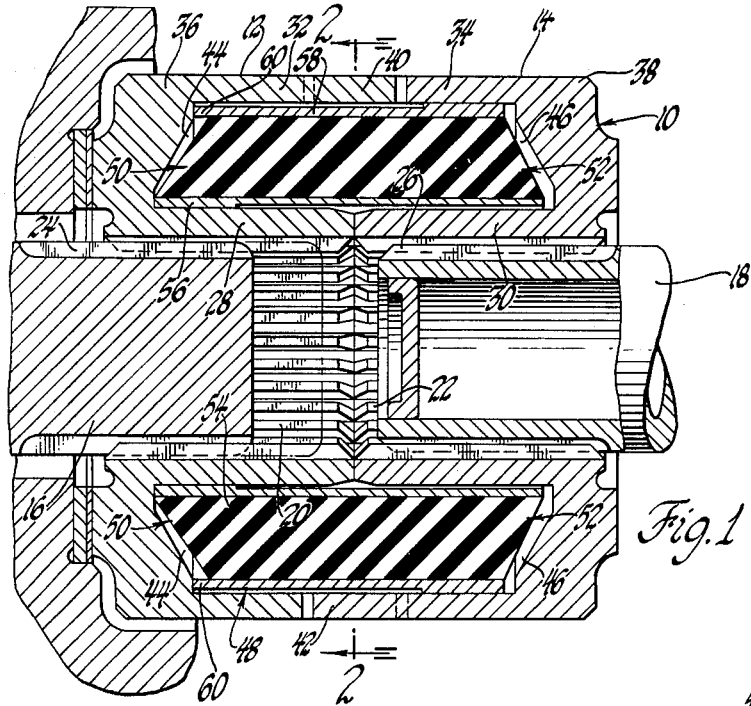
FIGURE 1 is a section view, with portions cut away, of the improved couplings connecting the associated shafts in operating position.
Figure 2:
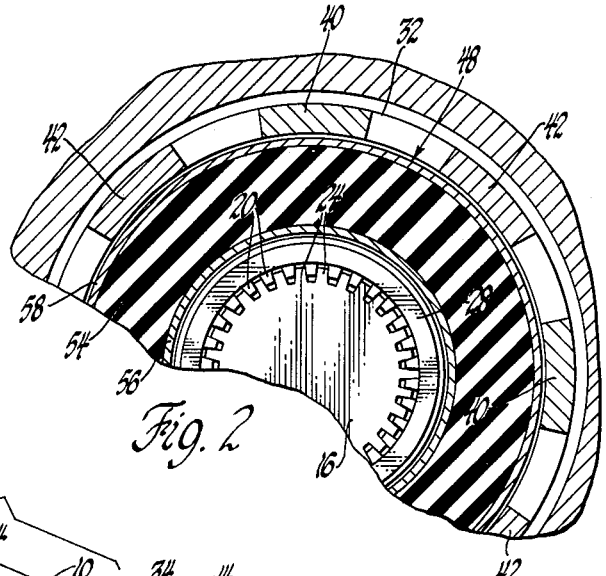
FIGURE 2 is a view, taken in the direction of the arrows, substantially along the line 2—2 of FIGURE 1 showing the cross section of the improved coupling.
Figure 3:
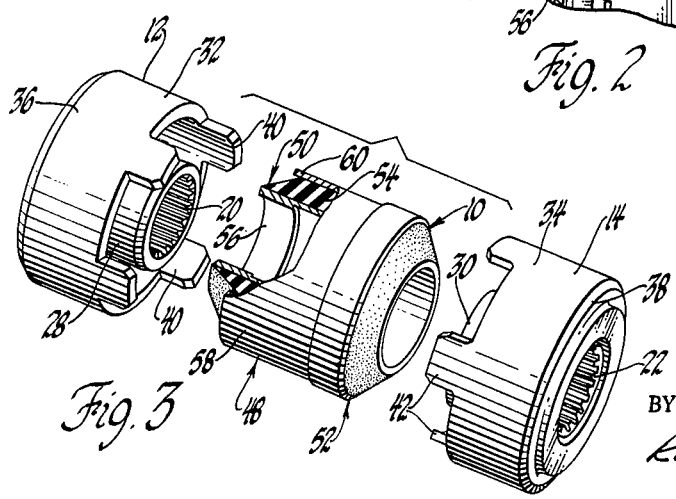
FIGURE 3 is an elevational view, in perspective, with sections broken away, showing the separate parts of the improved coupling.

Referring to the drawings, as best seen in FIGURES 1 and 3, the improved coupling 10 consists of a pair of coupling members 12 and 14 secured to a propeller shaft 16 and a transmission input shaft 18, respectively. As shown in this embodiment, the coupling members 12 and 14 are substantially identical; however, to practice this invention they need not be identical. In the present embodiment, as best seen in FIGURES 1 and 2, the coupling members 12 and 14 have spline sections 20 and 22, respectively, for mating with the spline sections 24 and 26 formed on the end portions of shafts 16 and 18, respectively. While a splined method of attaching the coupling members to the shaft is shown in this embodiment, it is not intended to limit the invention to that means of attaching the couplings to the shafts; a key type engagement or any other suitable method for securing the couplings to the shafts would be equally acceptable.

Each of the coupling members 12 and 14 has an inner axially extending annular boss 28, 30, respectively, and an outer axially extending annular boss 32, 34, respectively. Base portions 36 and 38 interconnect the annular bosses 28–32 and 30–34, respectively. The outer bosses 32, 34 are concentric with and in a plane radially spaced outwardly from the outer surface of the inner annular bosses 28, 30. A plurality of fingers 40, 42 extend from the outer bosses 32, 34, respectively. The fingers 40, 42 are in the same plane as the bosses 32, 34 and radially spaced parallel to the inner bosses 28, 30. The inner bosses 28, 30 and the outer bosses 32, 34 extending from the base portions 36, 38 form circular cavities 44, 46 in the respective coupling members 12, 14.

A cylindrical insulating sandwich or torque transmitting member 48 is adapted to have one end 50 inserted in the cavity 44 and the other end 52 inserted in cavity 46 to form the completed coupling assembly.

The insulating sandwich 48 consists of a resilient core member 54, such as rubber, having a stepped inner sleeve 56 and a stepped outer sleeve 58 bonded thereto. The inner sleeve is formed with a stepped construction on its inner surface, such that the inner diameter of end 50 is substantially equal to the external diameter of inner boss 28, so that in assembly a press fit is obtained which results in a frictional non-slip engagement therebetween. The inner diameter of inner sleeve 56 at the end 52 is formed slightly larger than the external diameter of inner boss 30, such that in assembly a slip fit is obtained therebetween. The outer sleeve 58 is formed with a stepped construction on its outer surface, so that the outer diameter of end 50 is slightly less than the inner diameter of the outer boss 32, so that in assembly a slip fit is obtained therebetween. The outer diameter of sleeve 58 at end 52 is substantially the same diameter as the inner surface of outer boss 34, such that in assembly a press fit is obtained which results in a frictional non-slip engagement therebetween. Thus, it can be seen that torque transmitted from one coupling member to the other must travel through the resilient core.

In assembly position, the teeth 40 of coupling member 12 and the teeth 42 of coupling member 14 are in the same radial plane and are axially spaced so that should the torque transmitting member 48 fail the teeth 40, 42 would interlock to provide an emergency transmission of torque from one coupling member to the other.

The coupling members 12 and 14 are designed so that their inner bosses 28 and 30 contact each other when the coupling members are in operating position, thus providing a metal to metal contact for definitely limiting the overall length of the coupling. An axial biasing force for holding the coupling member 12 and 14 in contact is provided by deflection of the flexible core portion 54 of the torque transmitting member 48 during assembly of the coupling. The outer sleeve 58 has an end portion 60 which extends axially beyond the end 50 of the core portion 54 while the inner sleeve 56 is coextensive with the core. Thus, with this design, during assembly of the torque transmitting member 48 into cavity 44, the end portion 60 of the outer sleeve 58 contacts the base 36 before the end 50 of sleeve 56 contacts the base 36 as it is being press fit on the inner boss 28. Such prior contacting deflects the resilient core 54 setting up an axial internal stress in the resilient core which biases the outer sleeve toward base 36.

To complete the coupling assembly, the coupling member 14 is pressed on the end 52 of the insulator sandwich 48 until the inner boss 30 of coupling member 14 contacts the inner boss 28 of coupling member 12.

In the service of transmitting torque from shaft 16 to shaft 18, the torque transmitting member 48 oscillates relative to the coupling member 12 and there is relative movement at the point the outer sleeve 58 contacts the base 36 since the inner sleeve is in a press fit non-slip frictional contact with the boss 28 and the outer sleeve 58 is in a slip fit relative to the outer boss 32 and biased toward base 36 by the deformation of the core during assembly. After a short amount of use, the end 60 of the outer sleeve wears off by the oscillating and frees the contact between the outer sleeve 58 and the base 36. Then the axial stress in the insulator urges the outer sleeve 58 toward the base 36 whereby the bosses 28 and 30 are maintained in contact. Such axial biasing by the insulator eliminates the need for snap rings and maintains the overall length of the couplings by maintaining the contact between the inner bosses 28 and 30.

While the preferred embodiment of this invention has been shown and described herein, it is obvious that many structural changes may be made without departing from the spirit and scope of the following claims.

I claim:

1. A resilient coupling for transmitting torque from a first to a second shaft, said coupling comprising first and second coupling members rotatable with said first and second shafts, respectively, said first coupling member comprising a first axially extending boss and a second axially extending boss radially spaced from and concentric with said first boss, said second coupling member comprising a third axially extending boss and a fourth axially extending boss radially spaced from and concentric with said third boss, torque transmitting means for transmitting torque between said coupling members including inner and outer sleeves enclosing a resilient member therebetween, said outer sleeve being in press fit non-slipping engagement with the second boss of said first coupling member and capable of angular rotation with respect to the fourth boss of said second coupling member, said inner sleeve being in press fit non-slipping engagement with the third boss of said second coupling member and capable of angular rotation with respect to the first boss of said first coupling member.

2. A resilient coupling for transmitting torque from a first to a second shaft, said coupling comprising first and second coupling members rotatable with said first and second shafts, respectively, said first coupling member comprising a first axially extending boss and a second axially extending boss radially spaced from and concentric with said first boss, said second coupling member comprising a third axially extending boss and a fourth axially extending boss radially spaced from and concentric with said third boss, said first and third bosses having adjacent ends in abutting engagement, torque transmitting means for transmitting torque between said coupling members including inner and outer sleeves, a resilient member disposed between and bonded to said sleeves, said outer sleeve being in press fit non-slipping engagement with the second boss of said first coupling member and capable of angular rotation with respect to the fourth boss of said second coupling member, said inner sleeve being in press fit non-slipping engagement with the third boss of said second coupling member and capable of angular rotation with respect to the first boss of said first coupling member, said outer sleeve having an axially extending end portion in contact with said second coupling member and providing initial deflection of said resilient member when said resilient member is assembled to said second coupling member, said end portion of said outer sleeve being subject to wear during operation of said assembly, said deflected resilient member being effective to apply a thrust to said outer sleeve for maintaining said adjacent ends of said coupling members in contact relationship upon wear of said extended outer sleeve end portion.

3. A resilient coupling assembly for joining adjacent ends of a pair of aligned shafts for transmitting torque therebetween, said coupling including a pair of cylindrical coupling members and a resilient cylindrical torque transmitting member for joining said coupling members, one of said coupling members being secured to one of the adjacent ends of one of the shafts and the other of said coupling members being secured to the other adjacent end of the other shaft, each of said coupling members being identical and having a cylindrical base portion, a first axially extending annular boss connected to said base portion and a second axially extending annular boss connected to said base portion outwardly spaced from and concentric with said first annular boss for forming a generally U-shaped cavity for receiving said torque transmitting member, said torque transmitting member comprising a flexible cylindrical core, an outer stepped sleeve bonded to the exterior surface of said flexible core and an inner stepped sleeve bonded to the interior surface of said flexible core, said outer stepped sleeve having one end portion of greater diameter and the other end portion of lesser diameter than the inner diameter of said second annular boss, said inner stepped sleeve having the one end portion of greater diameter and the other end portion of lesser diameter than the outer surface of said first annular boss whereby upon insertion of said torque transmitting member into said U-shaped cavities a press fit is obtained with each coupling wherein the one end of the outer sleeve is held in frictional non-slip engagement with the second annular boss of one coupling member and the other end of the inner sleeve is held in frictional non-slip engagement with the first annular boss of the other coupling member.

4. A resilient coupling assembly for joining adjacent ends of a pair of aligned shafts for transmitting torque therebetween, said coupling including first and second cylindrical coupling members and a resilient cylindrical torque transmitting member for joining said coupling members, said first coupling member being secured to one of the adjacent ends of one of the shafts and said second coupling member being secured to the other adjacent end of the other shaft; each of said coupling members being identical and having a cylindrical base portion, a first axially extending annular boss connected to said base portion and a second axially extending annular boss connected to said base portion outwardly spaced from and concentric with said first annular boss for forming a generally U-shaped cavity for receiving said torque transmitting member, said first bosses of said coupling members being axially aligned and in abutting engagement for maintaining the overall length of said coupling assembly; said resilient cylindrical torque transmitting member comprising a flexible cylindrical core, an outer stepped sleeve bonded to the exterior surface of said flexible core and an inner stepped sleeve bonded to the interior surface of said flexible core, said outer stepped sleeve having one end portion of greater diameter and the other end portion of lesser diameter than the diameter of the inner surface of said second annular bosses, said other end portion of said outer sleeve extending axially beyond the end of said flexible core, said inner stepped sleeve having the one end portion of greater diameter and the other end portion of lesser diameter than the outer surface of said first annular bosses, said torque transmitting member having said one end portion of said outer sleeve in press fit non-slipping engagement with said second annular boss of said first coupling member and said other end portion of said inner sleeve in press fit non-slipping engagement with said first annular boss and contacting said base portion of said second coupling member, and said extended other end portion of said outer sleeve contacting said base of said second coupling member prior to said other end portion of said inner sleeve during assembly of said coupling for deflecting said flexible core whereby the resilience of said core causes said extended other end portion of said outer sleeve to wear during operation of said assembly and such wear permits the deflected resilient member to bias said coupling members toward each other for maintaining the first bosses of said coupling members in abutting engagement.

References Cited by the Examiner

UNITED STATES PATENTS

| 2,720,764 | 10/1955 | Landrum | 64—27 |
| 2,867,102 | 1/1959 | Williams | 64—11 |
| 3,138,943 | 5/1964 | Gustke | 64—27 |

FOREIGN PATENTS

| 1,260,083 | 3/1961 | France. |

BROUGHTON G. DURHAM, *Primary Examiner.*

HALL C. COE, *Assistant Examiner.*